US008132591B2

(12) United States Patent
Nishino

(10) Patent No.: US 8,132,591 B2
(45) Date of Patent: Mar. 13, 2012

(54) DUCT POSITIONING FOR SWITCHING VALVE FOR TRACTORS

(75) Inventor: Akifumi Nishino, Sakai (JP)

(73) Assignee: Kubota Corporation, Osaka (JP)

( * ) Notice: Subject to any disclaimer, the term of this patent is extended or adjusted under 35 U.S.C. 154(b) by 367 days.

(21) Appl. No.: 12/047,723

(22) Filed: Mar. 13, 2008

(65) Prior Publication Data

US 2008/0238153 A1 Oct. 2, 2008

(30) Foreign Application Priority Data

Mar. 30, 2007 (JP) ................................. 2007-093501

(51) Int. Cl.
*B60R 16/08* (2006.01)
(52) U.S. Cl. ...................... 137/354; 248/68.1; 180/90.6
(58) Field of Classification Search .................. 137/351, 137/354, 899; 60/325, 429; 180/90.6; 248/68.1
See application file for complete search history.

(56) References Cited

U.S. PATENT DOCUMENTS

| 5,216,935 | A | * | 6/1993 | Shimamura et al. | ............ | 74/512 |
| 5,231,891 | A | * | 8/1993 | Morita et al. | ................... | 74/512 |
| 2006/0225927 | A1 | * | 10/2006 | Iwaki et al. | ................... | 180/6.3 |

FOREIGN PATENT DOCUMENTS

| JP | 4-110406 U | 9/1992 |
| JP | 7117586 A | 5/1995 |
| JP | 8207615 A | 8/1996 |
| JP | 2005054510 A | 3/2005 |
| JP | 2005067327 A | 3/2005 |
| JP | 2005088628 A | 4/2005 |

OTHER PUBLICATIONS

Two photographs of a John Deere tractor with designation 4310 on the hood.

* cited by examiner

*Primary Examiner* — John Rivell
*Assistant Examiner* — Kevin Murphy
(74) *Attorney, Agent, or Firm* — The Webb Law Firm

(57) ABSTRACT

The present invention provides a tractor, comprising: a vehicle body that is supported by a plurality of wheels; a switching valve that is disposed rearwardly of a vicinity of a rear end of a driver's station floor as viewed from above; a duct connecting member that is positioned at the front end of the driver's station floor and provided with a plurality of duct connecting ports; and a plurality of metal ducts that connect the switching valve and the duct connecting member below the driver's station floor, wherein the metal ducts are positioned on a laterally outer side of a portion, that is located below the driver's station floor, of a pedal arm for an operation pedal, the pedal arm being disposed at a front portion of the driver's station floor.

11 Claims, 11 Drawing Sheets

DUCT POSITIONING FOR SWITCHING VALVE FOR TRACTORS

BACKGROUND OF THE INVENTION

Some tractors are configured such that an implement can be coupled thereto. In a case where a front loader, which is an example of such an implement, is coupled to the front portion of a vehicle body, a configuration as shown in, for example, JP H04-110406U is adopted, in which left and right support posts of the front loader are respectively coupled via brackets to mount sections provided on the left and right sides of the lower front portion in a driver's station. Here, switching valves for lifting/dropping a boom and for tilting a bucket and an operation lever for operating these switching valves are attached to one of the brackets.

In this conventional structure, in a case where an ordinary tractor operation that does not use the front loader is performed, if only the front loader is detached and the brackets are left, the operation lever not in use remains in the front portion of the driver's station and hampers driving. If the brackets are to be detached along with the front loader, it is also necessary to disconnect ducts connecting the switching valves and the front loader, as well as ducts connecting the switching valves and a hydraulic pressure take-off port and a hydraulic pressure return port of the tractor. In other words, the number of ducts that are to be disconnected increases. Thus, changing the structure requires effort in, for example, a case where an operation using the front loader and an ordinary tractor operation are frequently repeated.

SUMMARY OF THE INVENTION

The present invention was arrived at in view of these points, and it is an object thereof to provide a tractor that enables the structure for an operation using an implement and the structure for an ordinary tractor operation to be switched with less effort, and enables maintenance of ducts in a hydraulic circuit for the implement to be easily performed.

The present invention is directed to a tractor, comprising:
 a vehicle body that is supported by a plurality of wheels;
 a switching valve that is disposed rearwardly of a vicinity of a rear end of a driver's station floor as viewed from above;
 a duct connecting member that is positioned at the front end of the driver's station floor and provided with a plurality of duct connecting ports; and
 a plurality of metal ducts that connect the switching valve and the duct connecting member below the driver's station floor, wherein the metal ducts are positioned on a laterally outer side of a portion, that is located below the driver's station floor, of a pedal arm for an operation pedal, the pedal arm being disposed at a front portion of the driver's station floor.

According to this configuration, with the structure for an operation using an implement, a hydraulic hose extended from hydraulic equipment such as a hydraulic cylinder provided in the implement is connected to the duct connecting member positioned at the front end of the driver's station step. With the structure for an ordinary tractor operation, the hydraulic hose is detached from the duct connecting member.

The plurality of metal ducts that connect the duct connecting member and the switching valve are arranged below the driver's station step. The metal ducts are positioned on the laterally outer side of a portion of the pedal arm below the driver's station step. Thus, duct work for connecting the duct connecting member and the switching valve in communication with each other and subsequent duct maintenance can be performed easily, without being hampered by the operation pedal from the laterally outer side in the vehicle body.

In an embodiment, it is preferable that the duct connecting member is disposed such that the plurality of duct connecting ports form a vertical row.

In an embodiment, it is preferable that a front end portion of the driver's station floor is extended upward at a front portion of thereof, and the duct connecting member is provided below the front end portion.

In an embodiment, it is preferable that four metal ducts are arranged to form two left and right rows and two upper and lower rows, and positioned below the driver's station floor.

In an embodiment, it is preferable that a support member of the duct connecting member is fixed to a lower face of the driver's station floor.

In an embodiment, it is preferable that the switching valve is positioned rearwardly of the front end of a driver's seat.

DETAILED DESCRIPTION OF PREFERRED EMBODIMENTS

Figure 1:
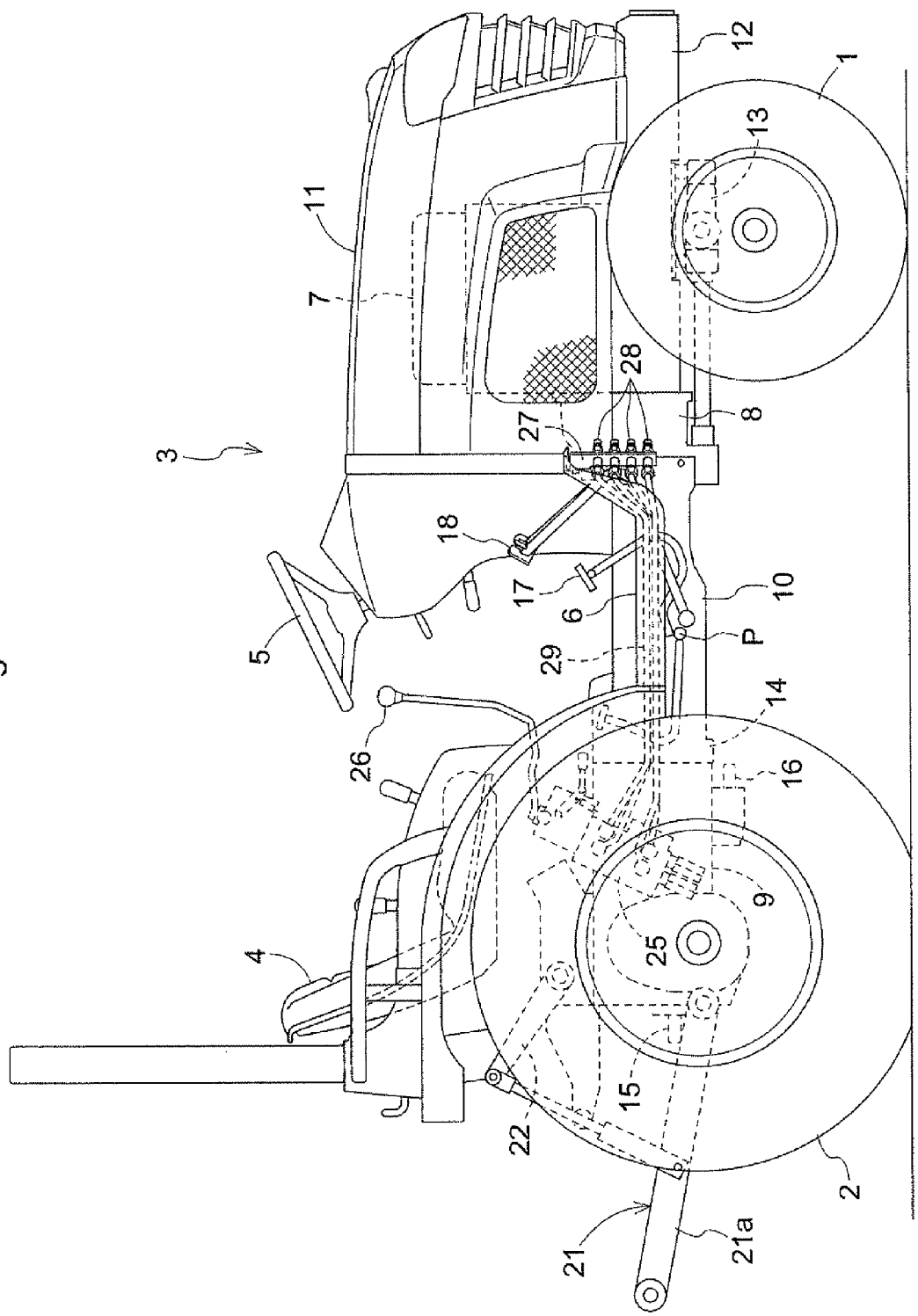
FIG. 1 is a side view of a tractor.
Figure 2:
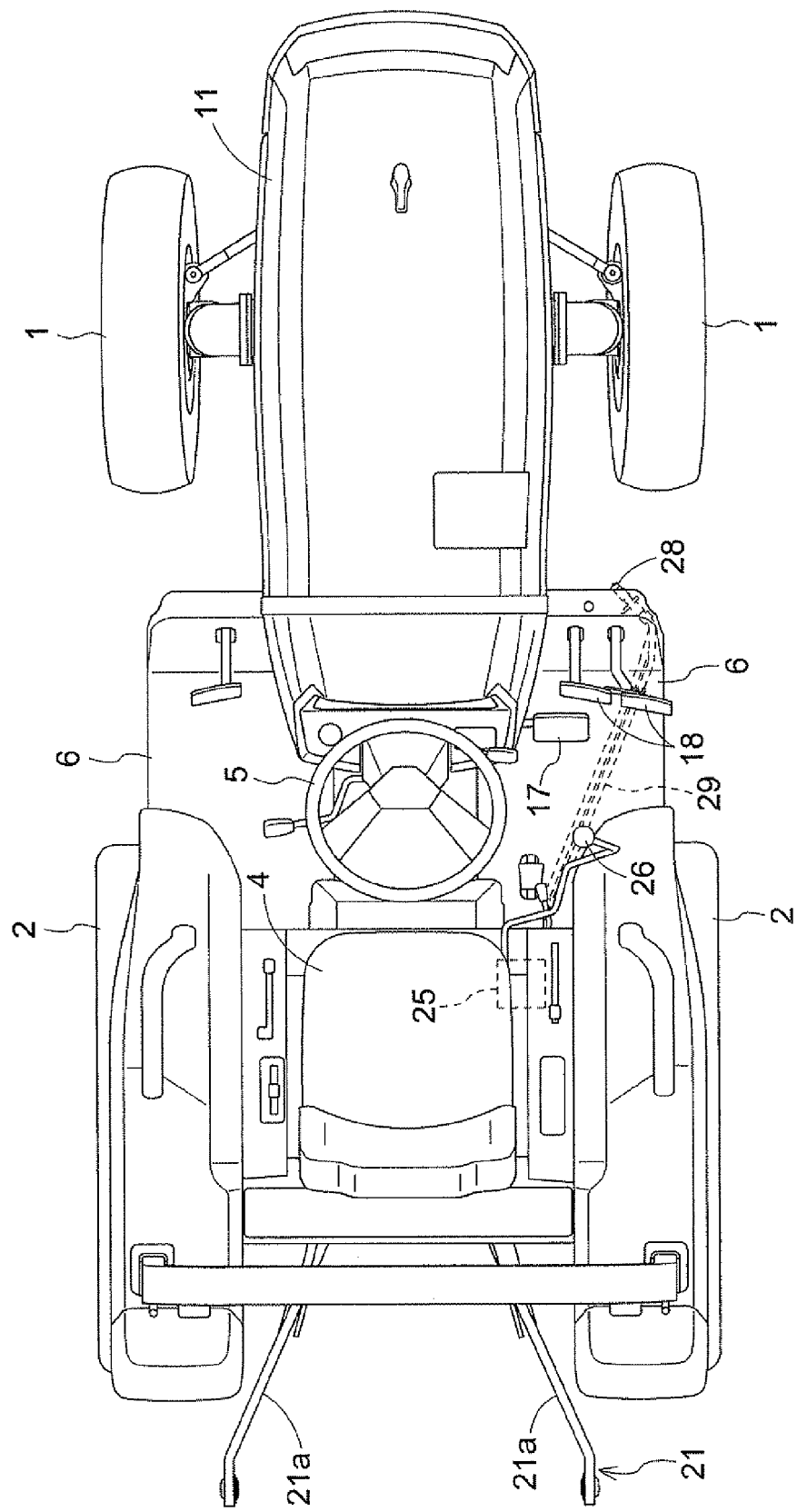
FIG. 2 is a plan view of the tractor.

FIG. 1 is a side view of a tractor according to the present invention. FIG. 2 is a plan view of the tractor. This tractor is configured such that a four-wheel drive traveling vehicle body 3, provided with front wheels 1 and rear wheels 2, includes a driver's seat 4, a steering wheel 5 for steering the front wheels, a driver's station step 6 (driver's station floor), and the like. The driver's station step 6 constitutes the floor of the driver's station area, and provides a step surface on which the driver can place his or her feet or that can be used when the driver mounts the tractor.

The traveling vehicle body 3 is configured such that a main clutch housing 8 is directly connected to the rear end of an engine 7 positioned in the front portion of the vehicle body, and the main clutch housing 8 and a transmission case 9 are coupled via an intermediate housing 10 made of a hollow metal plate. The engine 7 is covered with a hood 11. A front axle case 13 is supported so as to be capable of rolling on a front frame 12 that is coupled to the engine 7, wherein the left and right front wheels 1 are attached and supported on the front axle case 13 such that they can be freely steered. The rear wheels 2 are rotatably supported on the left and right sides of the rear portion in the transmission case 9.

Engine motive power taken from the main clutch housing 8 is axially transmitted to a hydrostatic continuously variable transmission (HST) 14 that is directly connected to the front end of the transmission case 9, and continuously shifted forward and in reverse. The motive power shifted forward or in reverse is varied in speed by shifting a gear between a plurality of levels inside the transmission case 9, and transmitted to the left and right rear wheels 2. The motive power for driving the front wheels branched from the rear wheel transmission system is axially transmitted to the front portion of the vehicle body, and transmitted to the front axle case 13.

A part of the engine motive power input to the continuously variable transmission 14 is directly transmitted to a PTO transmission system inside the transmission case 9 without being shifted. The engine motive power is taken from a rear PTO shaft 15 that is provided in the rear portion of the transmission case 9 and a mid PTO shaft 16 that is provided in the lower portion of the transmission case 9, as live PTO motive power that is a rotational force having a constant speed regardless of the traveling speed.

On the right side in the driver's station step 6, a speed change pedal 17 that can be swung about a fulcrum p and that is biased so as to return to the neutral position is disposed and linked to a speed change actuation shaft (not shown) of the continuously variable transmission 14. The speed change pedal 17 is integrally provided with a forward pedal 17f and a rearward pedal 17b via front and rear pedal arms 17a. The forward traveling speed increases as the forward pedal 17f is depressed. The rearward traveling speed increases as the rearward pedal 17b is depressed. When neither pedal is depressed, the speed change pedal 17 automatically returns to the neutral position, and the speed becomes zero (the tractor stops).

Figure 4:
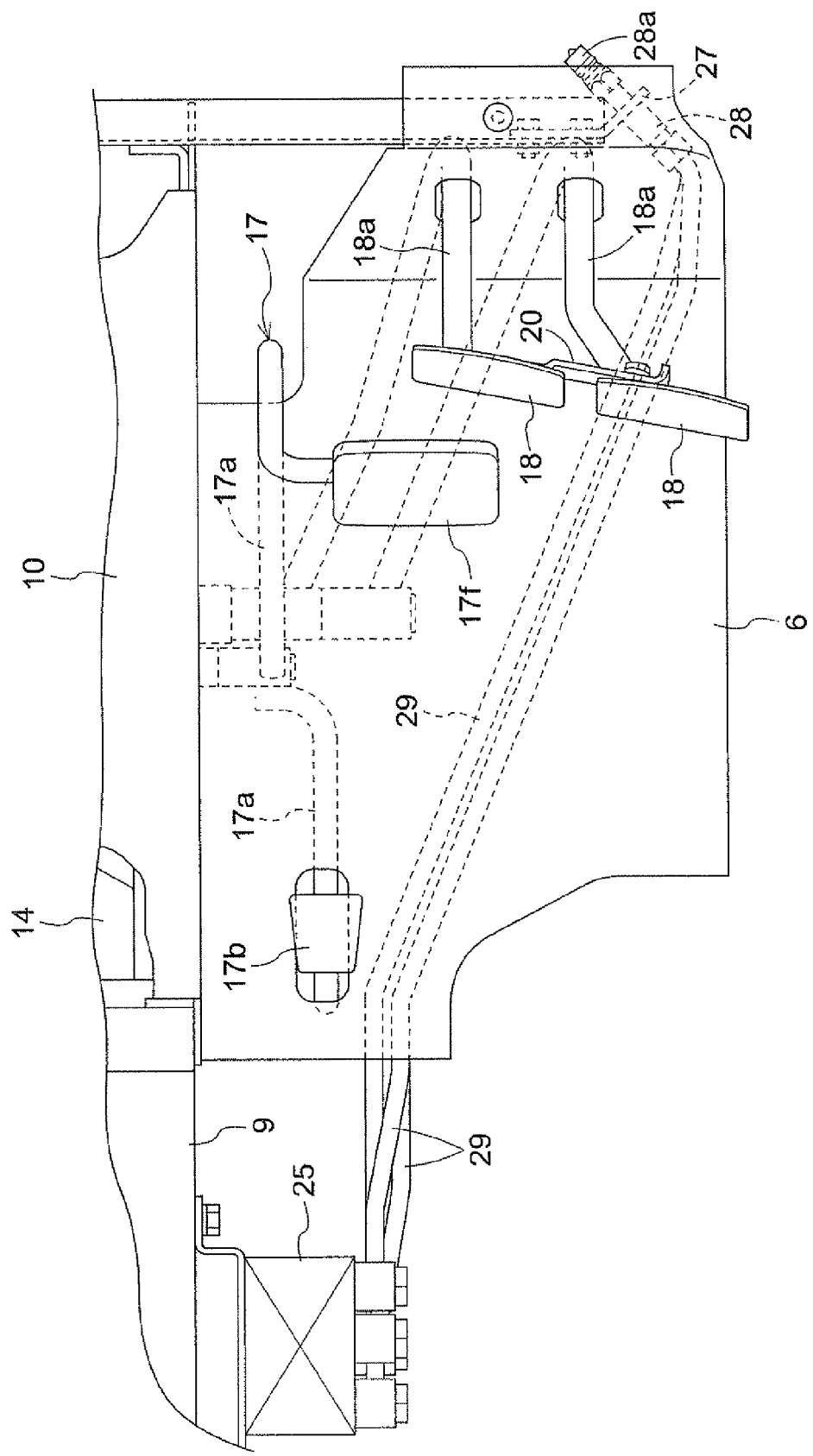
FIG. 4 is a plan view showing the hydraulic duct structure.
Figure 5:
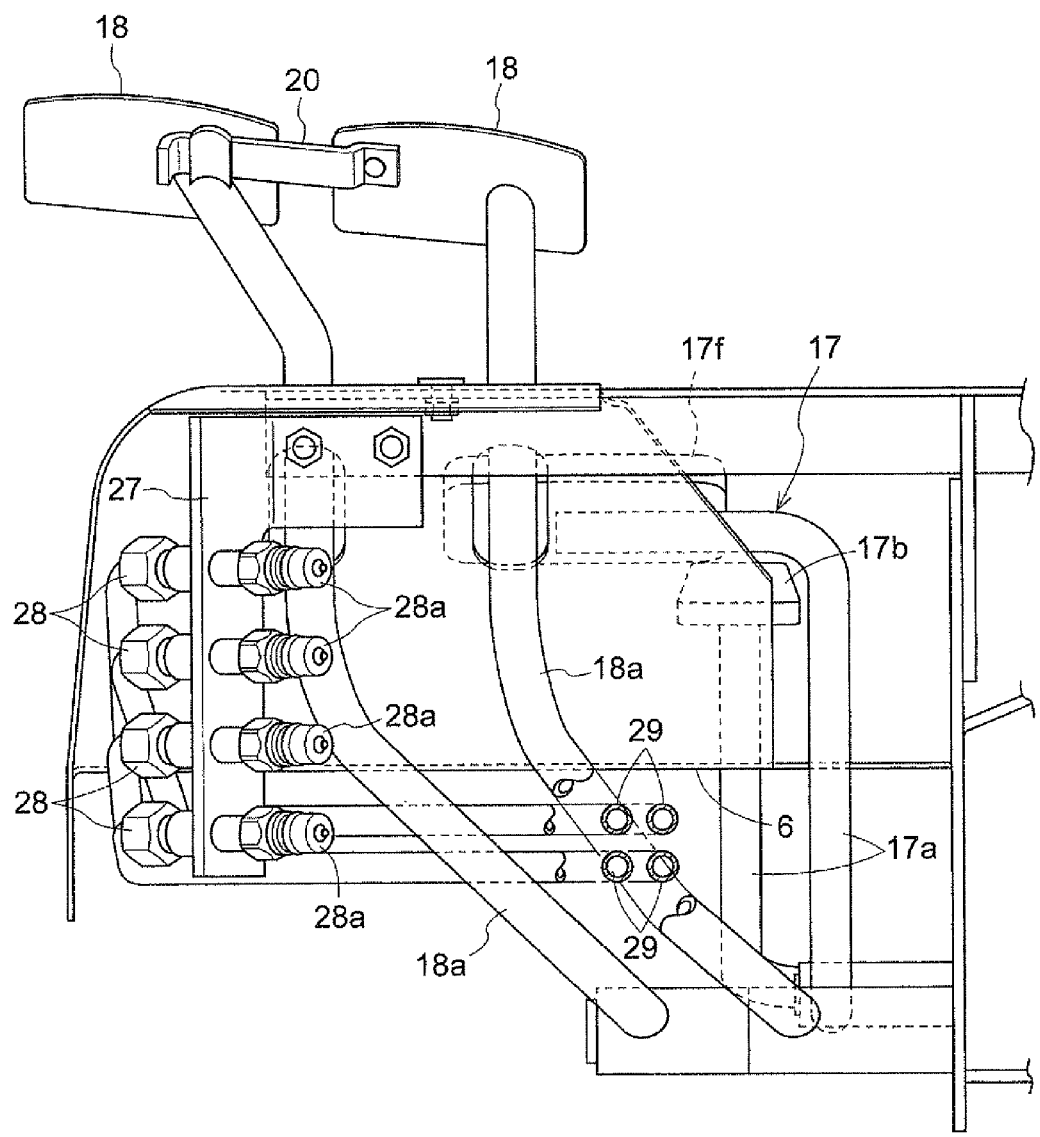
FIG. 5 is a front view of a duct connecting portion.

A pair of left and right side brake pedals 18 are arranged on the front right side in the driver's station step 6. The side brake pedals 18 are respectively linked to side brakes 19 that are provided on the left and right sides of the transmission case 9. In a state where the front wheels 1 are steered to the left or right, it is possible to move the tractor in a small orbit by depressing only one side brake pedal 18 corresponding to the inner side of the orbit, thereby applying a brake on the rear wheel 2 corresponding to the inner side of the orbit, and it is possible to stop the tractor by depressing both side brake pedals 18. In travel such as road travel, if both side brake pedals 18 are integrally coupled by a coupling fitting 20 as shown in FIGS. 4 and 5, a braking operation can be performed by not only one of but rather by both of the side brakes 19 simultaneously. Furthermore, if both side brake pedals 18 integrally coupled by the coupling fitting 20 are caught and held at the depressed position for braking, the side brakes can be used as a parking brake.

The rear portion of the transmission case 9 is provided with a three-point link mechanism 21 and a hydraulically-driven lift arm 22 that lifts and drops a pair of left and right lower links 21a in the three-point link mechanism 21. It is possible to perform various operations by coupling operation devices to the three-point link mechanism 21 and driving the coupled operation devices with the rear PTO shaft 15. The motive power taken from the mid PTO shaft 16 can drive a mower or other mid-mount implements attached between the front wheels 1 and the rear wheels 2.

Figure 6:
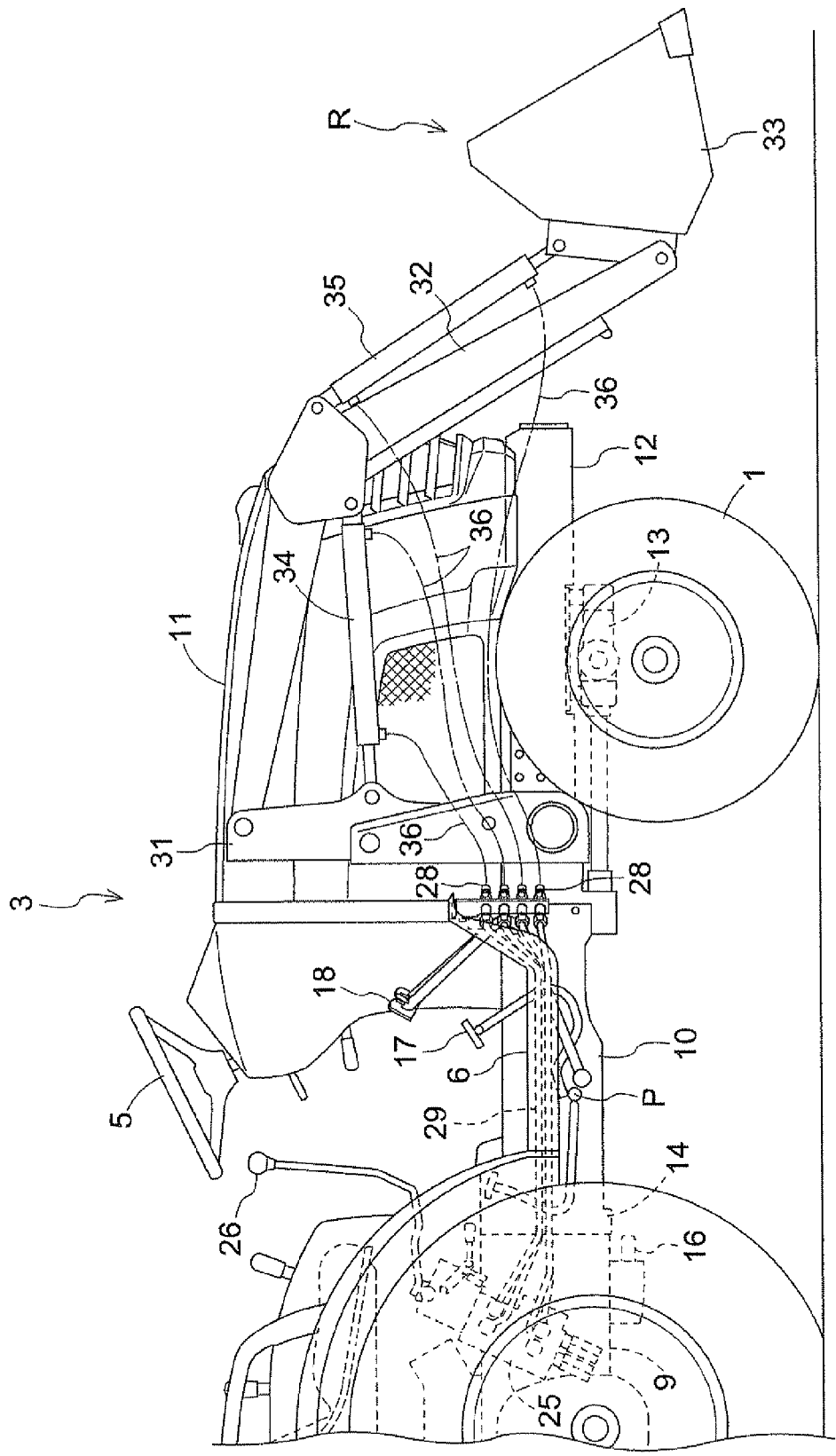
FIG. 6 is a side view of the tractor in a state where a front loader has been attached.
Figure 7:
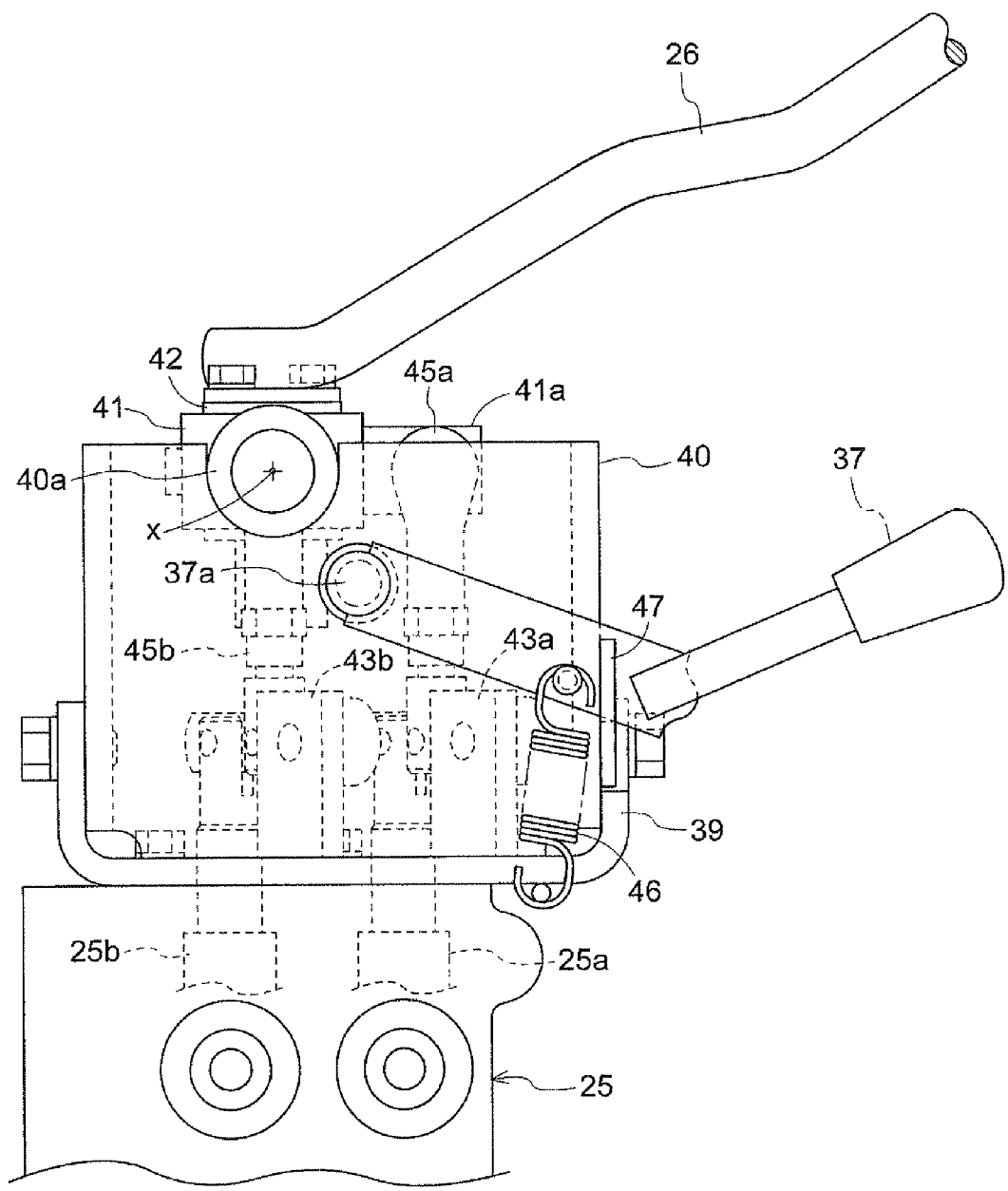
FIG. 7 is a side view of a switching valve operation portion.
Figure 8:
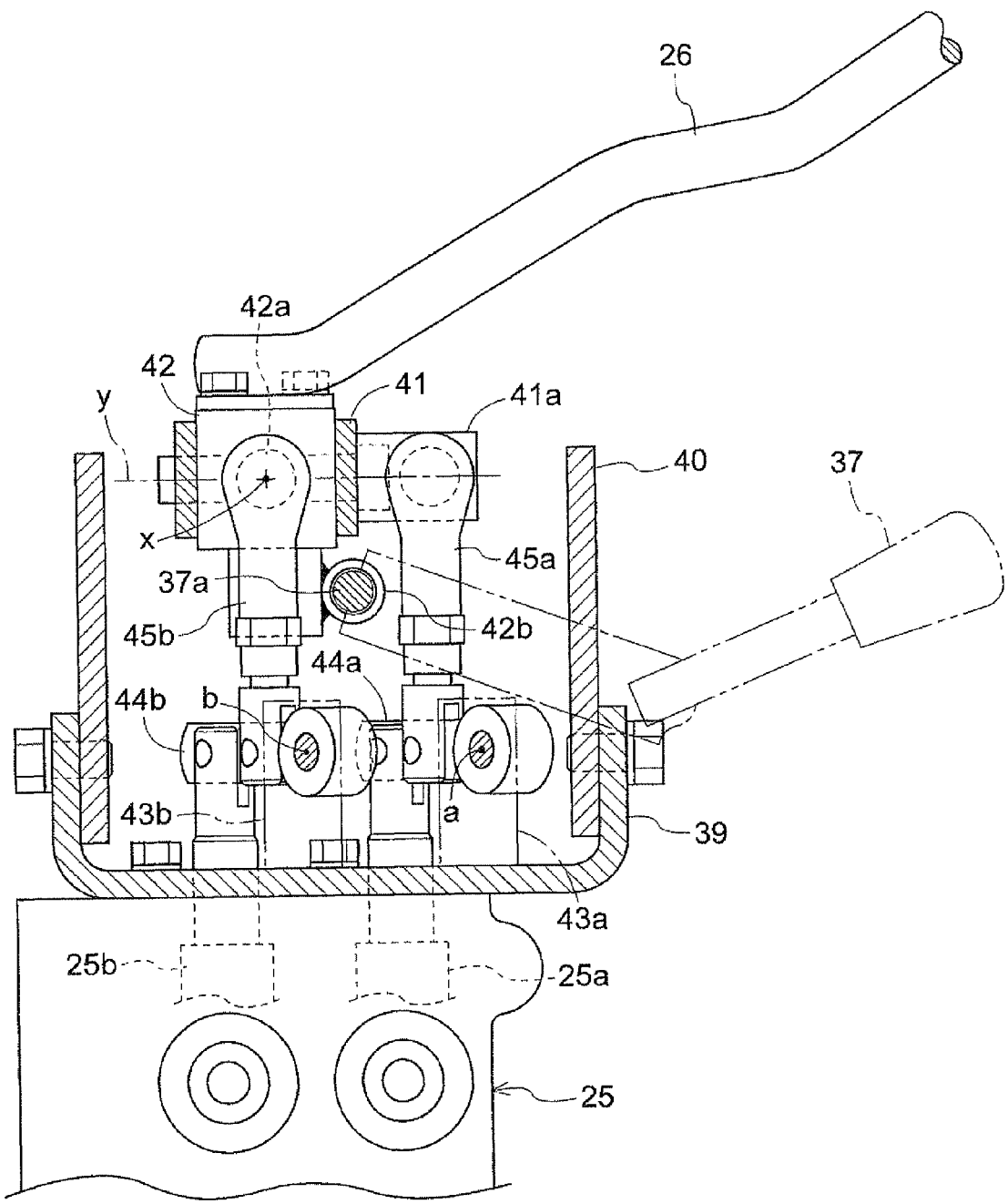
FIG. 8 is a cross-sectional side view of the switching valve operation portion.
Figure 9:
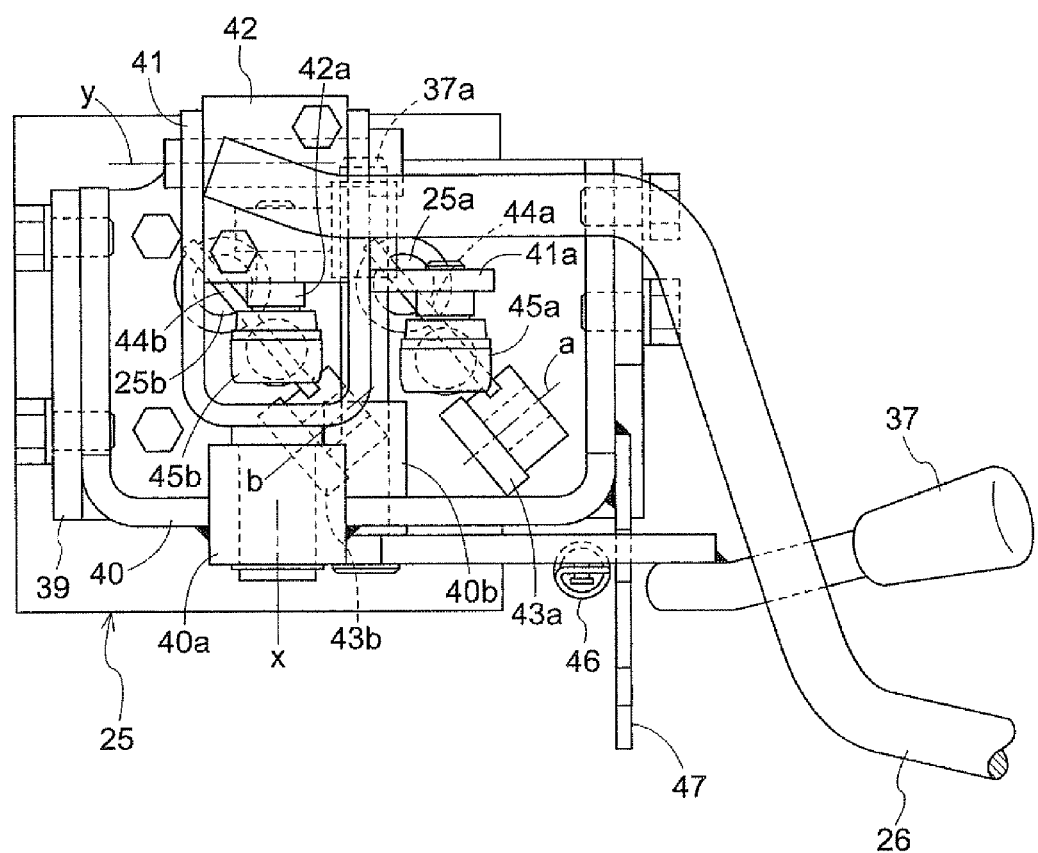
FIG. 9 is a plan view of the switching valve operation portion.

As shown in FIG. 6, a front loader R can be coupled to the front portion of the traveling vehicle body 3. Hydraulic equipment that drives the coupled front loader R is provided in the following manner.

On the right side of the driver's seat 4, a switching valve 25 that shares the hydraulic power source with the lift arm 22 is disposed in a fixed state, and an operation lever 26 that switches the switching valve 25 is extended forward. The switching valve 25 is disposed to the rear of the rear end of the driver's station step 6. Furthermore, the switching valve 25 is positioned to the rear of the front end of the seat portion of the driver's seat 4. In the switching valve 25, two spools 25a and 25b that can be switched between three positions are provided side by side so as to be vertically slidable, and are linked to the operation lever 26 as described below. Pressure oil can be supplied to and discharged from two hydraulic circuits by operating the operation lever 26 in one direction and in the direction perpendicular to the one direction.

Figure 3:
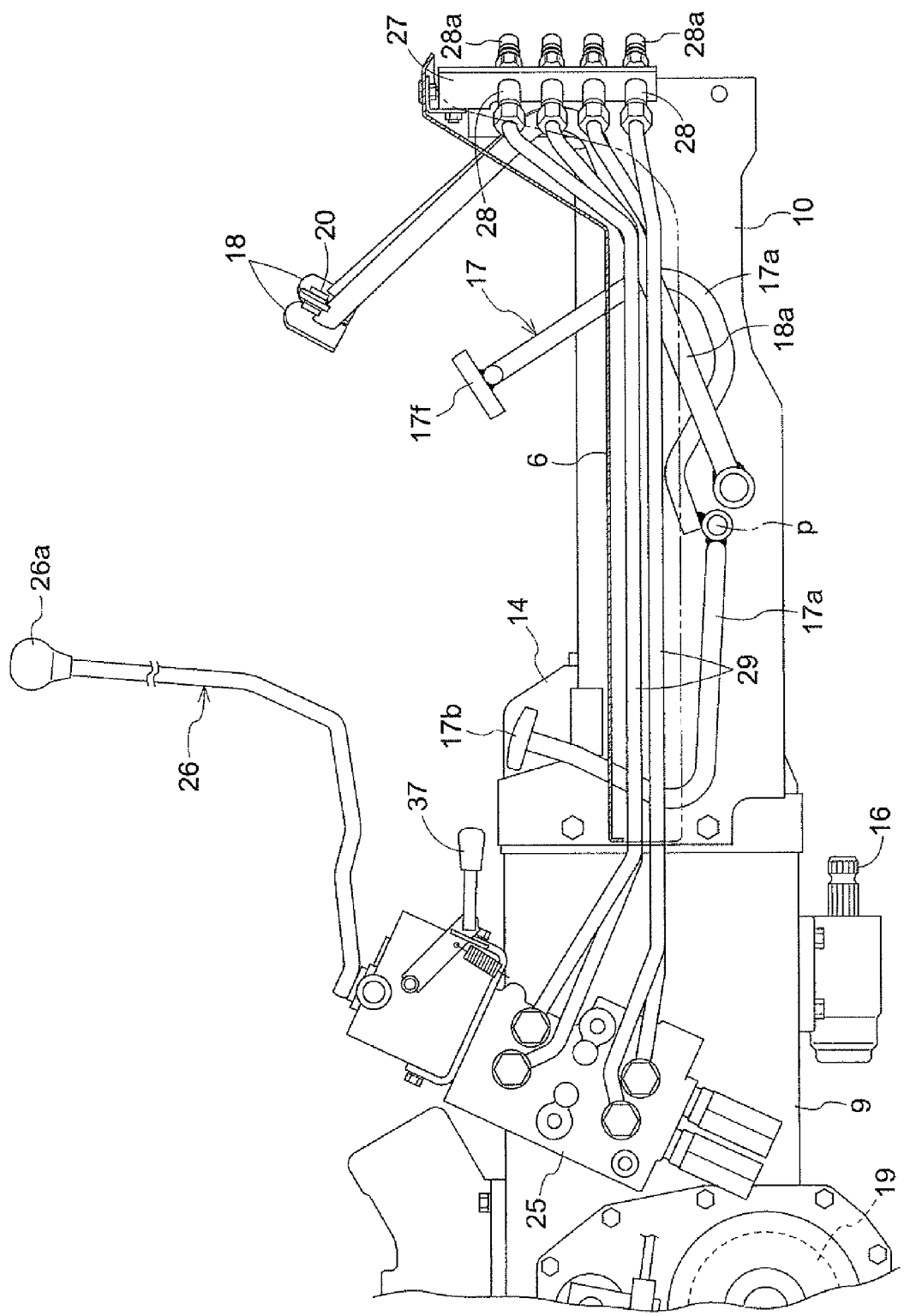
FIG. 3 is a side view showing a hydraulic duct structure.

The front end portion of the driver's station step 6 is extended upward as shown in FIG. 3, and duct connecting members are provided below the front end portion that is extended upward. More specifically, a stay 27 (support member) extended from the traveling vehicle body 3 is disposed on the front right side in the driver's station step 6. Four duct connecting members 28 provided with self-closing duct connecting ports 28a are attached to the stay 27 in one vertical row. The duct connecting members 28 and the switching valve 25 are connected in communication with each other via four metal ducts 29. As shown in FIG. 3, the stay 27 is fixed to the lower face of the drivers station step 6 by a known technique, such as, for example, using a bolt.

The four metal ducts 29 connected in one vertical row to the duct connecting members 28 are arranged to form two left and right rows and two upper and lower rows below the driver's station step 6. The metal ducts 29 arranged in this manner pass through a position on the laterally outer side of the pedal arms 17a of the speed change pedal (operation pedal) 17 and pedal arms 18a of the side brake pedals (operation pedals) 18 in the vehicle body. More specifically, the metal ducts 29 are positioned on the laterally outer side of a portion of the pedal arms 17a and 18a below the driver's station step 6.

The front loader R is configured such that a boom 32 is pivotally coupled, so as to be capable of being vertically swung, to a support frame 31 that is coupled and fixed on the left and right sides of the front portion in the traveling vehicle body 3, and such that a bucket 33 is pivotally coupled to the front end of the boom 32 so as to be capable of being swung to carry out a dumping operation. A boom cylinder 34 and a bucket cylinder 35 constituted by cylinders that allow back-and-forth movement are connected in communication via pressure-resistant hydraulic hoses 36 with the four duct connecting members 28.

FIGS. 7 to 11 show the operation structure of the switching valve 25. A support bracket 40, in the shape of a U when viewed from above, is coupled and fixed via a base plate 39 to the upper end of the valve body of the switching valve 25. A first operation fitting 41 in the shape of a U when viewed from above is pivotally supported and attached so as to be capable of being turned about a lateral fulcrum x, on a lateral boss portion 40a provided in the support bracket 40. A second operation fitting 42 is pivoted on the first operation fitting 41 so as to be capable of being turned about a fore-and-aft fulcrum y. The base end of the operation lever 26 is fixedly attached to the upper face of the second operation fitting 42.

A pair of fulcrum fittings 43a and 43b are provided in an upright position on the upper face of the base plate 39. Free end portions of operation links 44a and 44b are respectively pinned to the spools 25a and 25b, the operation links 44a and 44b being pivotally coupled to the fulcrum fittings 43a and 43b so as to be capable of being vertically swung about fulcrums a and b.

An operation arm 41a is extended forward from the first operation fitting 41. An operation pin 42a is extended laterally outward from the second operation fitting 42. The operation arm 41a and an intermediate in the longitudinal direction of the one operation link 44a are operatively coupled via a link fitting 45a having a ball fulcrum. The operation pin 42a and an intermediate in the longitudinal direction of the other operation link 44b are operatively coupled via a link fitting 45b having a ball fulcrum.

Accordingly, when a grip 26a of the operation lever 26 is in the neutral position in the fore-and-aft direction and left-and-right directions, both spools 25a and 25b are in the neutral position. When the grip 26a of the operation lever 26 is moved forward or backward from the neutral position, the first operation fitting 41 is turned about the lateral fulcrum x, and the one spool 25a vertically is slid. When the grip 26a of the operation lever 26 is moved from the neutral position to the left or right, the second operation fitting 42 is turned about the fore-and-aft fulcrum y, and the other spool 25b vertically is slid.

Where the front loader R is attached, the boom cylinder 34 is duct-connected to a hydraulic circuit that is switched by the one spool 25a, and the bucket cylinder 35 is duct-connected to a hydraulic circuit that is switched by the other spool 25b. In this case, the ducts are set such that the boom cylinder 34 is retracted and the boom 32 is moved downward if the grip 26a of the operation lever 26 is operated forward from the neutral position, the boom cylinder 34 is extended and the boom 32 is moved upward if the grip 26a of the operation lever 26 is operated backward from the neutral position, the bucket cylinder 35 is extended and the bucket 33 is tilted downward for a dumping operation if the grip 26a of the operation lever 26 is operated to the right from the neutral position, and the bucket cylinder 35 is retracted and the bucket 33 is tilted upward for a scooping operation if the grip 26a of the operation lever 26 is operated to the left from the neutral position.

Figure 10:
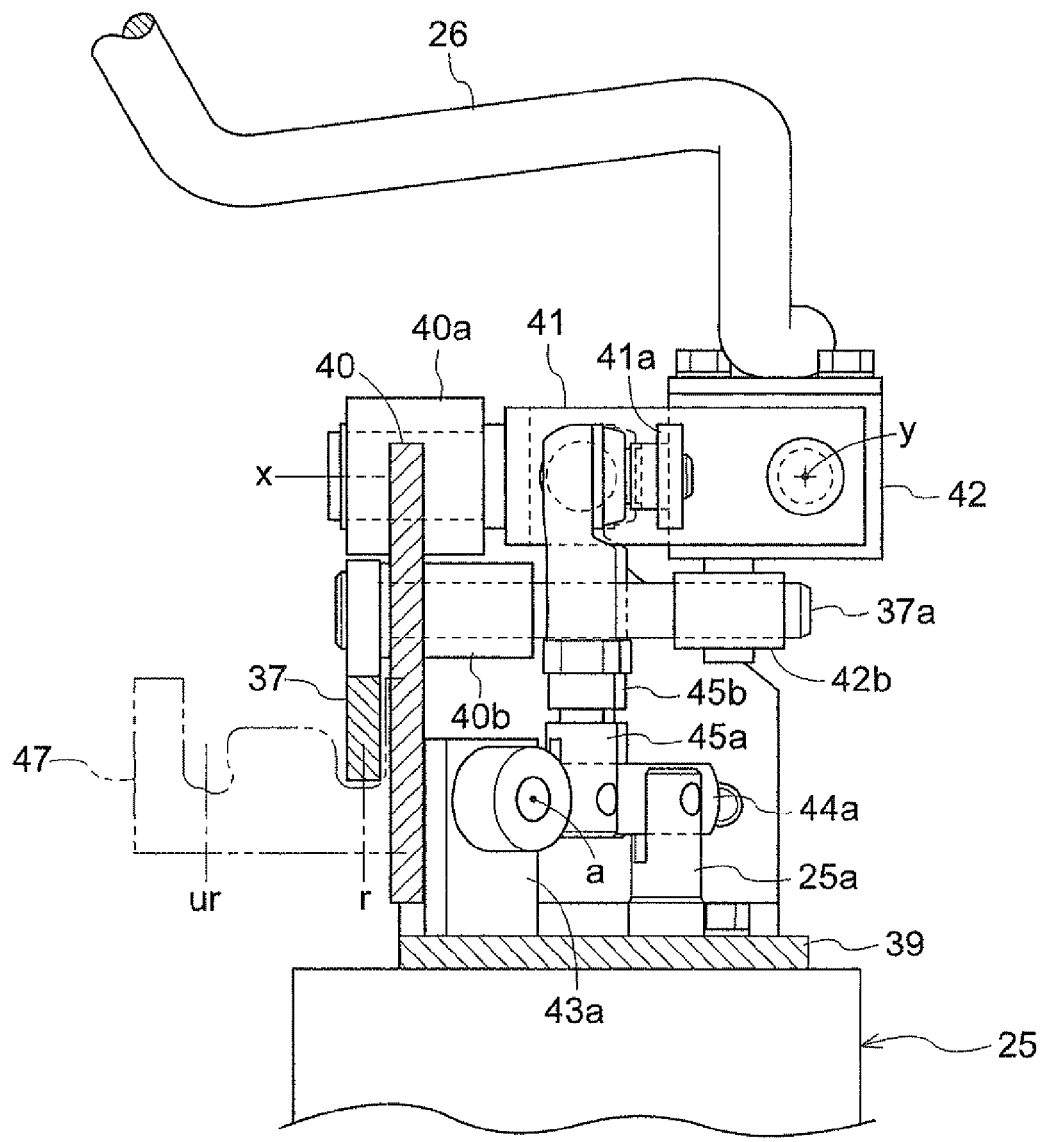
FIG. 10 is a front view showing a locked state of the switching valve operation portion.
Figure 11:
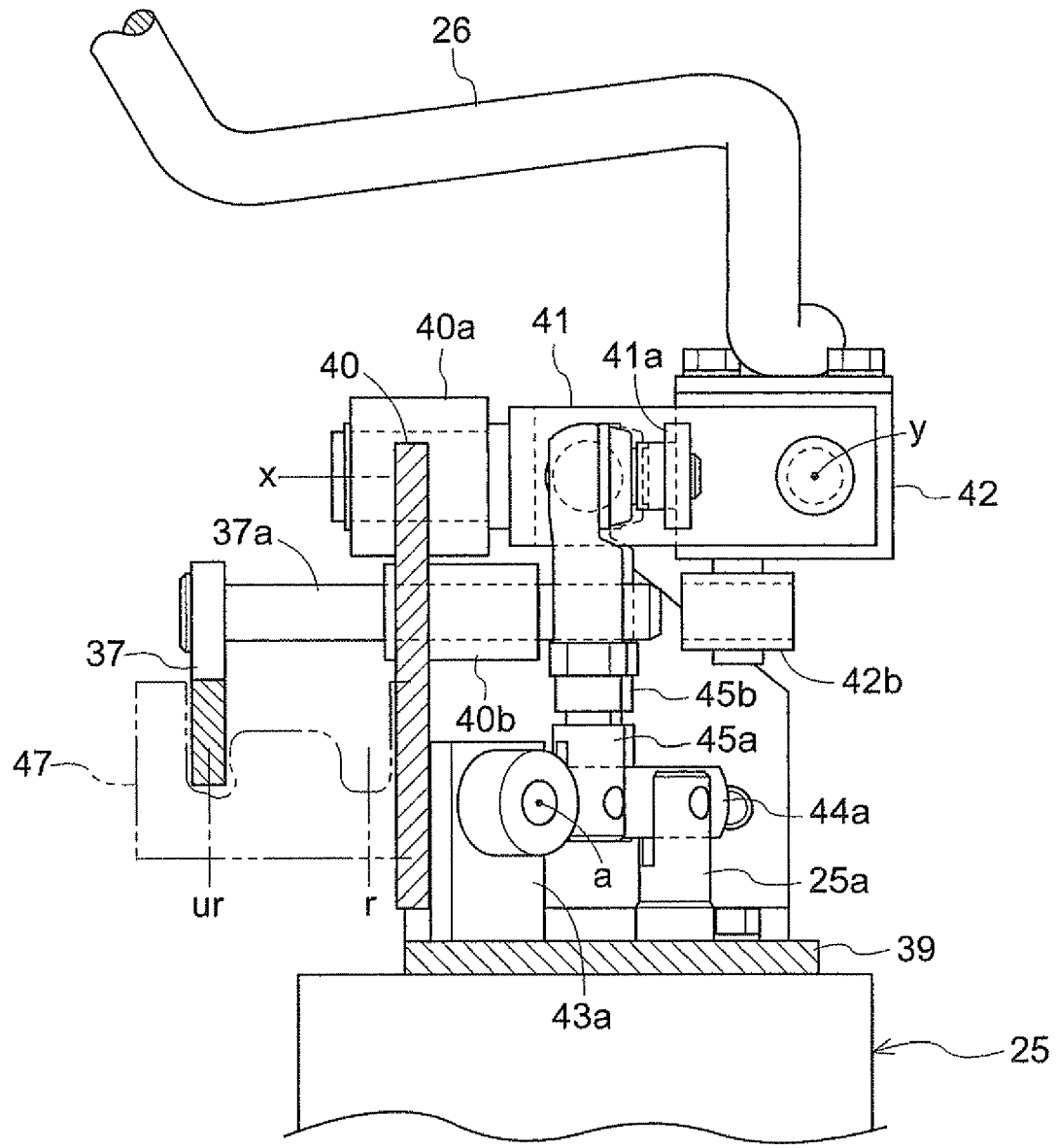
FIG. 11 is a front view showing an unlocked state of the switching valve operation portion.

In the support bracket 40, a hydraulic pressure lock lever 37 for mechanically fixing and holding the operation lever 26 at the neutral position is disposed. The hydraulic pressure lock lever 37 is coupled and fixed to the outer end of a lock shaft 37a that is inserted into and supported by a boss portion 40b of the support bracket 40 so as to be capable of being laterally slid and being turned. When no operation is performed, as shown in FIG. 10, the hydraulic pressure lock lever 37 is slid inward in the vehicle body, and the lock shaft 37a is inserted into a boss portion 42b provided in the second operation fitting 42. Thus, the operation lever 26 is mechanically fixed at the neutral position. When an operation is performed, as shown in FIG. 11, the hydraulic pressure lock lever 37 is slid outward in the vehicle body, and the lock shaft 37a is removed from the boss portion 42b of the second operation fitting 42. Thus, an operation in a cross shape (an operation in one direction and an operation in the direction perpendicular to the one direction) of the operation lever 26 is allowed.

The hydraulic pressure lock lever 37 is rotationally biased by a spring 46 in a downward direction so as to be engaged with a notched receiving fitting 47 fixed to the support bracket 40 at an unlock position ur on the laterally outer side and a lock position r on the laterally inner side.

Other Embodiments (1) Examples of the implement connected to and hydraulically driven by the duct connecting members 28 include not only the front loader R, but also snow clearing apparatuses, mowing apparatuses, and so on.

(2) The metal ducts 36 connecting the switching valve 25 and the duct connecting members 28 may be arranged side by side in one lateral row below the driver's station step 6.

What is claimed is:

1. A tractor, comprising:
a driver's station step including a stepping face provided at a forward portion thereof and a bent portion bent forward and upward from the stepping face;
an operation pedal swingably supported under the driver's station step, the operation pedal protruding upward of the driver's station step through an opening defined in the bent portion of the driver's station step;
a stay unit provided in front of the bent portion, the stay unit including a first stay extending laterally outward of a tractor body for supporting an upper end of the bent portion at a distal end thereof, and a second stay connected with the first stay, the second stay extending downward cantilever-wise from a connecting position with the first stay;
a plurality of duct connecting members provided separate from the second stay, the duct connecting members including respective duct connecting ports and respective duct connecting portions, the duct connecting members being attached to the second stay in one vertical row with the duct connecting ports being oriented forward and the duct connecting portions being oriented rearward;
a switching valve provided at a rear portion of the vehicle body; and
a plurality of metal ducts connected in communication with the switching valve, the metal ducts extending laterally outward of a pedal arm of the operation pedal from respective connecting positions with the switching valve along a lower face of the driver's station step; and change in orientation thereof upward into a vertical row within a space defined downward of the bent portion and laterally outward of the pedal arm of the operation pedal, with a distance between adjacent metal ducts being increased toward forward ends of the metal ducts, to be connected in communication with the respective duct connecting portions of the duct connecting members located laterally inward thereof.

2. The tractor according to claim 1, further comprising a speed change pedal provided separate from the operation pedal and supported to be swingable about a fulcrum extending downward of the driver's station step, the speed change pedal protruding upward of the driver's station step through a further opening defined in the stepping face of the driver's station step;
wherein as seen from a lateral side of the tractor, the plurality of the metal ducts extend between the lower face of the driver's station step and the fulcrum of the speed change pedal.

3. The tractor according to claim 1, wherein
four metal ducts are arranged to form two right/left rows and two upper/lower rows to extend laterally outward of the pedal arm of the operation pedal from respective connecting positions with the switching valve along the lower face of the driver's station step; and
wherein the four metal ducts change in orientation thereof upward into one vertical row within the space defined downward of the bent portion and laterally outward of the pedal arm of the operation pedal, and are connected in communication with the respective duct connecting portions of the four duct connecting members arranged in one vertical row at the second stay.

4. The tractor according to claim 2, wherein
four metal ducts are arranged to form two right/left rows and two upper/lower rows to extend laterally outward of the pedal arm of the operation pedal from respective connecting positions with the switching valve along the lower face of the driver's station step; and
wherein the four metal ducts change in orientation thereof upward into one vertical row within the space defined downward of the bent portion and laterally outward of the pedal arm of the operation pedal, and are connected in communication with the respective duct connecting portions of the four duct connecting members arranged in one vertical row at the second stay.

5. The tractor according to claim 1, wherein the operation pedal comprises a pair of right and left brake pedals provided side by side in a right/left direction.

6. The tractor according to claim 2, wherein the operation pedal comprises a pair of right and left brake pedals provided side by side in a right/left direction.

7. The tractor according to claim 3, wherein the operation pedal comprises a pair of right and left brake pedals provided side by side in a right/left direction.

8. The tractor according to claim 1, wherein the plurality of duct connecting members are attached to the second stay in an oblique orientation, with the duct connecting ports being oriented obliquely forward and inward, and the duct connecting portions being oriented obliquely rearward and outward; and
the plurality of the metal ducts, having changed in orientation thereof upward into the one vertical row within the space defined downward of the bent portion, further change in orientation thereof obliquely forward and inward to be connected in communication with the respective duct connecting portions of the duct connecting members.

9. The tractor according to claim 2, wherein the plurality of duct connecting members are attached to the second stay in an oblique orientation, with the duct connecting ports being oriented obliquely forward and inward, and the duct connecting portions being oriented obliquely rearward and outward; and
the plurality of the metal ducts, having changed in orientation thereof upward into the one vertical row within the space defined downward of the bent portion, further change in orientation thereof obliquely forward and inward to be connected in communication with the respective duct connecting portions of the duct connecting members.

10. The tractor according to claim 3, wherein the plurality of duct connecting members are attached to the second stay in an oblique orientation, with the duct connecting ports being oriented obliquely forward and inward, and the duct connecting portions being oriented obliquely rearward and outward; and
the plurality of the metal ducts, having changed in orientation thereof upward into the one vertical row within the space defined downward of the bent portion, further change in orientation thereof obliquely forward and inward to be connected in communication with the respective duct connecting portions of the duct connecting members.

11. The tractor according to claim 5, wherein the plurality of duct connecting members are attached to the second stay in an oblique orientation, with the duct connecting ports being oriented obliquely forward and inward, and the duct connecting portions being oriented obliquely rearward and outward; and
the plurality of the metal ducts, having changed in orientation thereof upward into the one vertical row within the space defined downward of the bent portion, further change in orientation thereof obliquely forward and inward to be connected in communication with the respective duct connecting portions of the duct connecting members.

\* \* \* \* \*